United States Patent [19]
Langley et al.

[11] Patent Number: 5,212,221
[45] Date of Patent: May 18, 1993

[54] STABILIZED PHTHALOCYANINE PIGMENT COMPOSITIONS

[75] Inventors: Robert Langley, Glasglow; Michael D. McFarlane, Houston, both of Scotland

[73] Assignee: Ciba-Geigy Corporation, Ardsley, N.Y.

[21] Appl. No.: 878,102

[22] Filed: May 4, 1992

[30] Foreign Application Priority Data

May 11, 1991 [GB] United Kingdom ............... 9110260

[51] Int. Cl.$^5$ .............................................. C08K 5/34
[52] U.S. Cl. .................................... 524/88; 524/428
[58] Field of Search ........................................ 524/88

[56] References Cited

U.S. PATENT DOCUMENTS

| | | | |
|---|---|---|---|
| 3,767,442 | 10/1973 | Kienzle et al. | 524/88 |
| 4,088,507 | 5/1978 | Tanaka et al. | 524/88 |
| 4,221,606 | 9/1980 | Fiunatsu et al. | 524/88 |
| 4,252,565 | 2/1981 | Irvine et al. | 524/88 |
| 4,981,888 | 1/1991 | Langley et al. | 524/88 |

FOREIGN PATENT DOCUMENTS 0343108 11/1989 European Pat. Off. .
0356390 2/1990 European Pat. Off. .
0378509 7/1990 European Pat. Off. .
1077622 3/1989 Japan .
1569837 6/1980 United Kingdom .

OTHER PUBLICATIONS

WPI Acc No: 82-1661E/09.

Primary Examiner—Paul R. Michl
Assistant Examiner—Tae H. Yoon
Attorney, Agent, or Firm—Luther A. R. Hall

[57] ABSTRACT

A heat-stable, pigmented thermoplastic resin composition comprising A) a thermoplastic resin; B) a metal phthalocyanine pigment; and C) 0.5 to 30% by weight of, based on the weight of component B), as agent for imparting heat stability to component B), a phthalocyanine compound having the formula (I):

$$MPc(CH_2NHCO-A)_y \qquad I$$

in which Pc is a phthalocyanine residue which is optionally substituted by up to an average of 1 chlorine or bromine atom, or of 1 sulphonic acid group; M is hydrogen or a metal capable of forming a metal phthalocyanine; y is a number ranging from 0.1 to 4.0; and A is $C_1$-$C_{21}$ alkyl, $C_2$-$C_{21}$ alkenyl, $C_5$-$C_8$ cycloalkyl, $C_7$-$C_{11}$ aralkyl, $C_6$- or $C_{10}$ aryl, or a 5- or 6-membered heterocyclic residue, or a fused heterocyclic system.

14 Claims, No Drawings

STABILIZED PHTHALOCYANINE PIGMENT COMPOSITIONS

The present invention relates to pigment compositions, in particular to pigmented thermoplastic resin compositions in which the pigment is stabilized against heat degradation by the presence of a phthalocyanine derivative.

In U.S. Pat. No. 4,981,888, there is described a heat-stable, pigmented thermoplastic resin composition comprising: A) a thermoplastic resin; B) a metal phthalocyanine pigment; and C) 0.5 to 30% by weight, based on the weight of pigment B), as agent imparting heat stability to pigment B), of a sulphonated imidomethyl phthalocyanine having the formula:

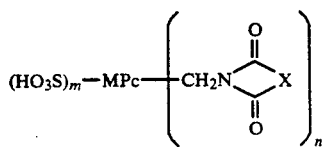

in which Pc is a phthalocyanine residue, optionally substituted by up to 4, preferably up to 1 chlorine or bromine atom, more preferably Pc being a phthalocyanine residue which is not substituted by chlorine or bromine; M is hydrogen or a metal capable of forming a metal phthalocyanine, preferably magnesium, aluminium, cobalt, nickel, iron, zinc, lead, tin or, especially, copper; m is a value within the range of from 0.05 to 1.0, preferably 0.05 to 0.2; n is a value within the range of from 0.1 to 4.0, preferably 1.0 to 3.0; and X is a residue such that, in combination with the group

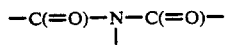

it forms a 5-, 6- or 7-membered cyclic imide.

In European Patent Specification 356390, a heat-stable, pigmented thermoplastic resin composition is disclosed comprising: A) a thermoplastic resin; B) a metal phthalocyanine pigment; and C) 0.5-30% by weight, based on the weight of the pigment B), as agent imparting heat stability to component B), of dimethylaminomethyl copper phthalocyanine having the formula:

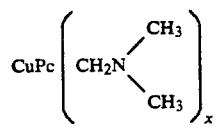

in which CuPc is a copper phthalocyanine residue, optionally substituted by up to 4, preferably up to 1 chlorine or bromine atom, or by up to 1 sulphonic acid group, more preferably CuPc being a copper phthalocyanine residue which is not substituted by chlorine or bromine atoms or by a sulphonic acid group; and x is a value within the range of from 0.1 to 4.0, preferably 1.0 to 3.0; or mixtures of these compounds having different values of x.

We have now found further compounds which impart excellent heat stabilizing properties to pigments used in thermoplastic resin compositions.

Accordingly, the present invention provides a heat-stable pigmented thermoplastic resin composition comprising A) a thermoplastic resin; B) a metal phthalocyanine pigment; and C) 0.5–30% by weight of, based on the weight of component B), as agent for imparting heat stability to component B), a phthalocyanine compound having the formula (I):

$$MPc(CH_2NHCO-A)_y \qquad I$$

in which Pc is a phthalocyanine residue which is optionally further substituted by up to an average of 1 chlorine or bromine atom, or of 1 sulphonic acid group, but which is preferably not further substituted by chlorine, bromine or sulphonic acid; M is hydrogen or a metal, e.g., Mg, Al, Ni, Fe, Co, Zn, Pb, Sn or preferably Cu, capable of forming a metal phthalocyanine; y is a number ranging from 0.1 to 4.0, preferably from 1.0 to 3.0 and A is $C_1$–$C_{21}$ alkyl, $C_2$–$C_{21}$ alkenyl, $C_5$–$C_8$ cycloalkyl, $C_7$–$C_{11}$ aralkyl, $C_6$– or $C_{10}$ aryl or a 5- or 6-membered heterocyclic residue or a fused heterocyclic system.

The thermoplastic resin, component A), may be, e.g. high density polyethylene (HDPE), polypropylene (PP) or any of the so-called "engineering plastics" such as polyethylene terephthalate (PETP), polybutylene terephthalate (PBTP), polycarbonate (PC), polyamide (PA), polyphenylene oxide (PPO), polyether-ether ketones (PEEK), polyphenylene sulphide (PPS), polyether sulphones (PES), acrylonitrile-butadiene-styrene (ABS) copolymers, polystyrene (PS), modified polyphenylene ethers, polyacetals and alloys of these, e.g., PC/PBTP alloys.

The metal phthalocyanine base pigment, component B) may be unchlorinated or chlorinated. If chlorinated, the base pigment preferably contains from 1 to 4% by weight of chlorine. Preferably the base pigment is copper phthalocyanine.

The metal phthalocyanine base pigment may be present in the composition of the present invention in amounts up to 30% by weight, preferably in amounts ranging from 0.001 to 3% by weight, based on the weight of component A).

Examples of $C_1$–$C_{21}$ alkyl groups A include methyl, ethyl, n-propyl, iso-propyl, n-butyl, sec-butyl, tert-butyl, n-pentyl, n-hexyl, n-octyl, 2-ethylhexyl, n-decyl, n-undecyl, n-dodecyl, n-tetradecyl, n-hexadecyl, n-heptadecyl, n-octadecyl, n-eicosyl and n-heneicosyl. Preferred alkyl groups A are $C_{10}$–$C_{20}$ alkyl groups, especially n-undecyl and n-heptadecyl.

Examples of $C_2$–$C_{31}$ alkenyl groups A are vinyl, prop-1-enyl, but-1-enyl, hex-1-enyl, hept-1-enyl, 2-propenyl (allyl), but-3-en-1-yl, (2-methyl)prop-2-en-1-yl (isobutenyl), 2,6-dimethyl hept-5-en-1-yl, dec-9-en-1-yl, tridec-8-en-1-yl, pentadec-8-en-1-yl, heptadec-8-en-1-yl, nonadec-10-en-1-yl, and heneicos-12-en-1-yl. Preferred alkenyl groups are those having 10 to 20 C-atoms, especially pentadec-8-en-1-yl and heptadec-8-en-1-yl.

Examples of $C_5$–$C_8$ cycloalkyl groups A are cyclopentyl, cyclohexyl and cyclooctyl, especially cyclohexyl.

$C_7$–$C_{11}$ Aralkyl groups A are, principally, benzyl or naphthyl methyl, especially benzyl.

$C_6$– or $C_{10}$ Aryl groups A are phenyl or naphthyl, preferably phenyl.

5- to 7-Membered heterocyclic residues A include furyl, thienyl, pyrryl, pyrazolyl, pyridyl and pyrazyl, 2-furyl and 3-pyrridyl being preferred.

Examples of fused heterocyclic systems A include indolyl, benzofuranyl, benzimidazolyl and quinolyl, especially 3-quinolyl.

Cyclic substituents A, namely cycloalkyl, aralkyl, aryl, heterocyclic and fused heterocyclic groups A, may contain one or more substituents, provided that such substituent groups do not impair the heat-stabilizing effect imparted by the compound of formula I to the heat degradable pigment component B). Examples of suitable substituent groups include $C_1$–$C_6$ alkyl groups, such as methyl, ethyl, n-propyl, n-butyl and n-hexyl groups; $C_1$–$C_6$ alkoxy groups, e.g. methoxy, ethoxy, n-propoxy, n-butoxy and n-hexoxy groups; hydroxy groups; nitro groups; and halogeno atoms such as chloro, bromo and iodo atoms.

The compounds of formula I may be produced by reacting an amino-methyl phthalocyanine having the formula II:

$$MPc(CH_2NH_2)_y \qquad \text{II}$$

in which M, Pc and y have their previous significance, with an acid halide having the formula III:

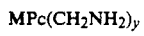
$$A{-}CO{-}hal \qquad \text{III}$$

in which A has its previous significance and hal denotes a halogeno atom, especially a chloro atom.

The starting materials of formula II and III are known compounds. The compounds of formula II, and their production, have been described, e.g. in GB Patent Specification No: 949737. Most of the acid halides of formula III are commercially-available.

The reactant of formula II should be substantially anhydrous, to obviate hydrolysis of the reactant of formula III. If reactant of formula II is initially provided as an aqueous presscake, therefore, the water content must first be removed, e.g. by azeotropic distillation, using a suitable solvent such as pyridine. The anhydrous reactant of formula II may then be reacted with the acid chloride of formula III, under conventional acylation conditions, e.g. by initial controlled addition of the acid chloride, preferably in the presence of an agent, conveniently pyridine, used in any initial de-watering treatment of reactant of formula II, capable of absorbing the hydrogen halide liberated during the acylation reaction.

The amount of the compound of formula I, present in the composition of the present invention, conveniently ranges from 0.5 to 20, especially from 1.0 to 10 percent weight, based on the weight of component B).

The compound of formula I may be combined with component B) during any stage of the processing of component B).

For example, the processing or conversion of a crude base phthalocyanine into pigmentary form may be effected by mixing the crude phthalocyanine with a compound of formula (I), and the mixture so obtained may then be milled. In a second method of producing a pigmentary phthalocyanine, a base pigment, component B), may be milled and treated with a polar organic solvent, e.g. isopropanol, which is at least partially water miscible. The compound of formula I may be incorporated at any of these stages of processing component B).

The pigmentary composition so obtained, comprising components B) and C), may be incorporated into the resin, component A), by any conventional method.

The following Examples further illustrate the present invention.

EXAMPLE 1

A. 20 Parts of aminomethyl copper phthalocyanine (containing about 2.5 aminomethyl groups per copper phthalocyanine molecule) are slurried, as a 21% solids presscake, in 300 parts of pyridine for 4 hours. The mixture is heated to boiling and the water-pyridine azeotrope is removed until the slurry is water-free (this requires the addition of pyridine). The mixture is then cooled to room temperature, 32.18 parts of benzoyl chloride are added and the stirred slurry is heated under reflux for 6 hours. The reaction mixture is then poured into 3000 parts of stirred cold water, filtered, and washed with copious quantities of cold water. 27.4 Parts of the product are obtained with a purity (acetone insolubles) of 95%.

B. To an aqueous slurry of 20 parts beta form copper phthalocyanine in 252 parts water is added 1 part (at 100%) of the product from A (as presscake). After 30 minutes stirring, concentrated hydrochloric is added to pH 1 and the mixture stirred for 1 hour at 55°–60° C. The pigment is filtered, washed with cold water until the filtrate is chloride free, then dried at 60° C. Yield is 21.3 parts.

C. The pigment as prepared in B is milled and sieved through a 150 micron screen. Onto a two-roll mill, with the rollers set at 150° C. and 110° C. and the nip gap at 0.3 mm, is introduced high density polyethylene (100 parts) which has previously been mixed with the pigment (1 part) via a dry tumbling operation. After milling, cutting, folding and reworking for 8 minutes, the nip is adjusted to 1.5 mm, and the hide sheeted off, allowed to cool to room temperature, and chipped.

The chipped material is fed to an injection moulding machine with the barrel set at 200° C. Once the feed is running uniformly through the machine, a high density polyethylene moulding is obtained which has a strong blue shade. The procedure is repeated several times with the barrel temperature being increased to 320° C. in 20° C. steps, with a 5 minute dwell time at each temperature.

The strong, blue shade is maintained to a temperature of 280°/300° C.

EXAMPLE 2

A. 50 Parts of aminomethyl phthalocyanine are reacted with 88.51 parts of p-toluoyl chloride in 750 parts of pyridine, under reflux conditions for 20 hours, using the procedure described in Example 1 (A). The reaction mixture so obtained is drowned into 7500 parts of cold water to give 77.1 parts of impure product.

B. The product obtained in step A) is then incorporated into beta-form copper phthalocyanine and subjected to the procedure described in Example 1 (B) and to give 21.03 parts of pure product.

C. The pure pigment prepared in step B) is then subjected to the procedure described in Example 1 (C) and gives a strong, blue shade which is maintained to a temperature of 280°/300° C.

We claim:

1. A heat-stable, pigmented thermoplastic resin composition comprising A) a thermoplastic resin; B) a metal phthalocyanine pigment; and C) 0.5 to 30% by weight of, based on the weight of component B), as agent for imparting heat stability to component B), a phthalocyanine compound having the formula (I):

MPc(CH$_2$NHCO—A)$_y$     I in which Pc is a phthalocyanine residue which is optionally substituted by up to an average of 1 chlorine or bromine atom, or of 1 sulphonic acid group; M is hydrogen or a metal capable of forming a metal phthalocyanine; y is a number ranging from 0.1 to 4.0; and A is C$_1$–C$_{21}$ alkyl, C$_2$–C$_{21}$ alkenyl, C$_5$–C$_8$ cycloalkyl, C$_7$–C$_{11}$ aralkyl, C$_6$ or C$_{10}$ aryl, or a 5- or 6-membered heterocyclic residue, or a fused heterocyclic system.

2. A composition according to claim 1 in which component A) is high density polyethylene, polypropylene or an engineering plastics material.

3. A composition according to claim 2 in which the engineering plastics material is polyethylene terephthalate, polybutylene terephthalate, polycarbonate, polyamide, polyphenylene oxide, polyether-ether ketone, polypenylene sulphide, polyether sulphone, acrylonitrile-butadiene-styrene copolymer, polystyrene, modified polyphenylene ether, polyacetal or an alloy of these.

4. A composition according to claim 1 in which component B) is copper phthalocyanine.

5. A composition according to claim 1 in which the component B) is present in an amount ranging from 0.001 to 3% by weight, based on the weight of component A).

6. A composition according to claim 1 in which Pc is a phthalocyanine residue which is not further substituted by chlorine, bromine or sulphonic acid.

7. A composition according to claim 1 in which M is H or copper.

8. A composition according to claim 1 in which y is 1.0 to 3.0.

9. A composition according to claim 1 in which A is C$_{10}$–C$_{20}$ alkyl, C$_{10}$–C$_{20}$ alkenyl, cyclohexyl, benzyl, phenyl, 2-furyl, 3-pyrridyl or 3-quinolyl.

10. A composition according to claim 9 in which A is n-undecyl, n-heptadecyl, pentadec-8-en-1-yl, heptadec-8-en-1-yl, cyclohexyl, benzyl, phenyl, 2-furyl, 3-pyrridyl or 3-quninolyl.

11. A composition according to claim 1 in which component C) is combined with component B) during any stage of the processing of component B).

12. A composition according to claim 1 in which the amount of component C) ranges from 0.5 to 20 percent by weight, based on the weight of component B).

13. A composition according to claim 12 in which the amount of component C) is from 1.0 to 10 percent by weight, based on the weight of component B).

14. A method of imparting heat stability to a metal phthalocyanine pigment, which is susceptible to degradation on exposure to heat, which pigment is present in admixture with a thermoplastic resin, comprising incorporating into the pigmented resin, 0.5 to 30% by weight, based on the weight of the metal phthalocyanine pigment, of a compound of formula I as defined in claim 1.

* * * * *